J. F. CHANDLER.
Rake and Hay Loader.
No. 93,806.
2 Sheets—Sheet 1.
Patented Aug. 17, 1869.
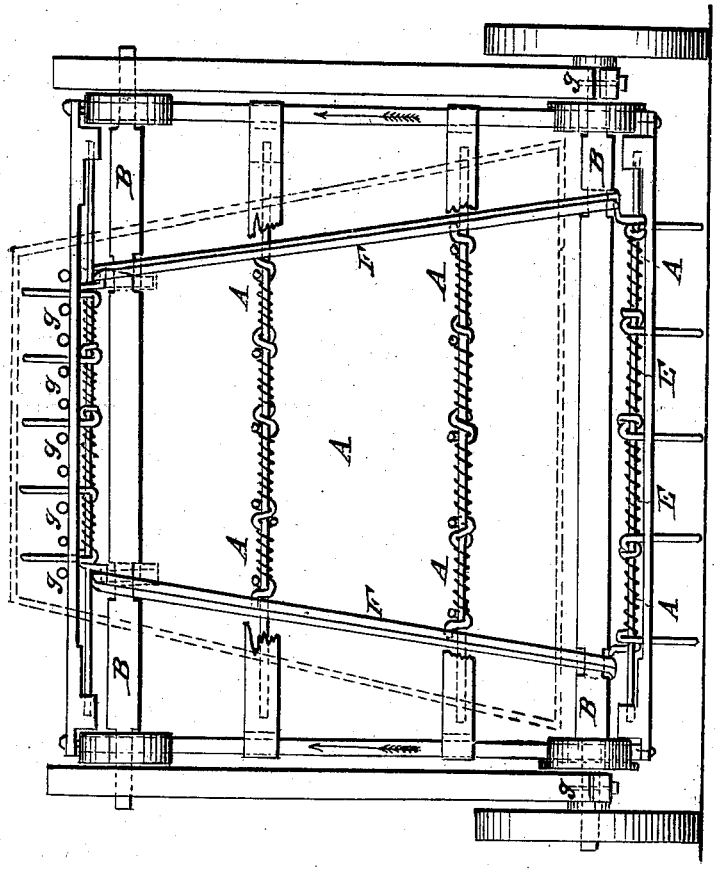
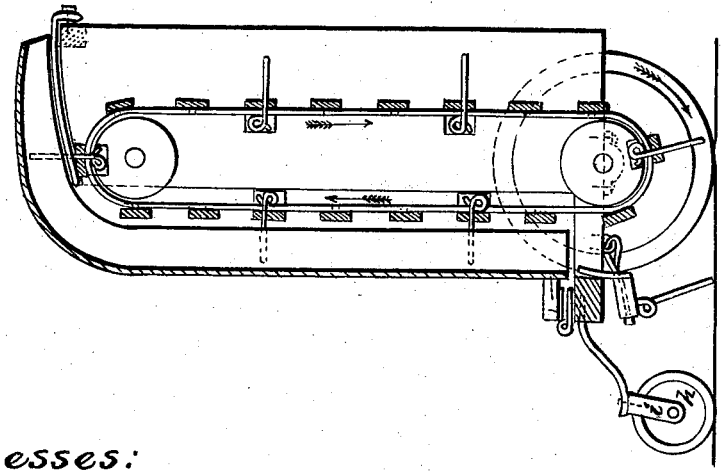
Witnesses:
J B Rand
Horace Call
Inventor
Jacob F Chandler J. F. CHANDLER.
Rake and Hay Loader.
No. 93,806.
2 Sheets—Sheet 2.
Patented Aug. 17, 1869.
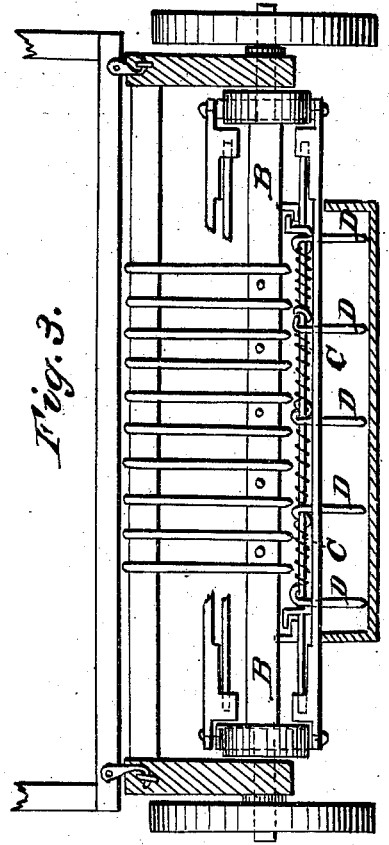
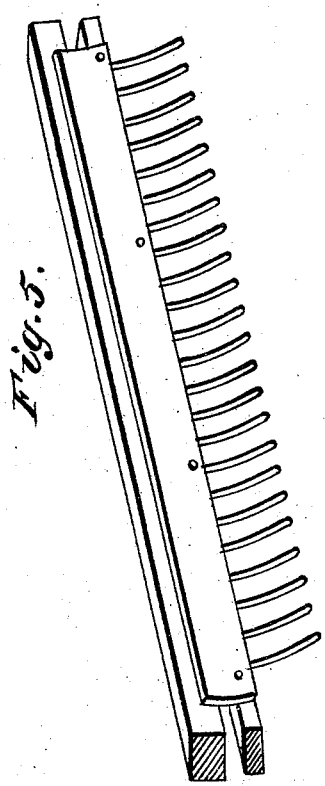
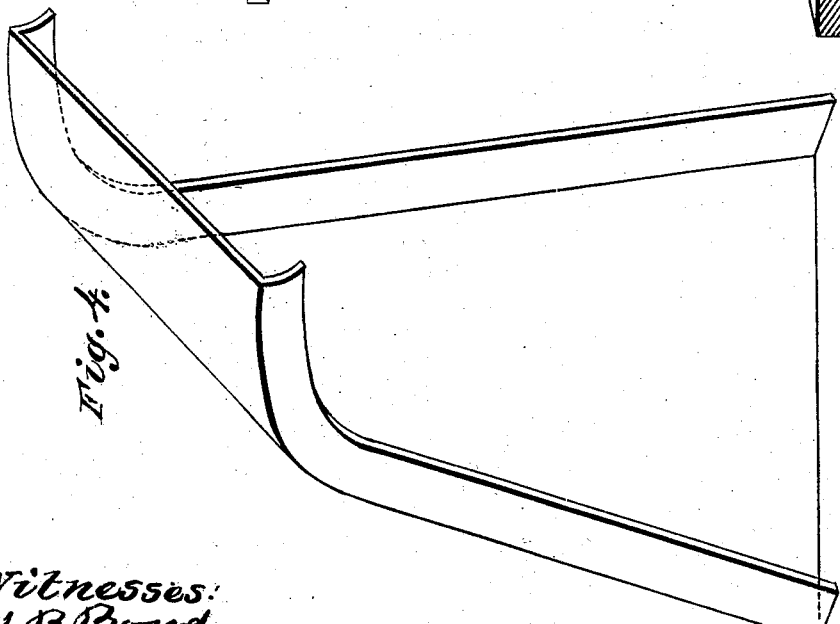
Witnesses:
J B Pond
Horace Call
Inventor
Jacob F Chandler

United States Patent Office.

JACOB F. CHANDLER, OF CONCORD, NEW HAMPSHIRE, ASSIGNOR TO HIMSELF AND ABNER F. DURGIN, OF SAME PLACE.

Letters Patent No. 93,806, dated August 17, 1869.

IMPROVEMENT IN HAY-RAKER AND LOADER.

The Schedule referred to in these Letters Patent and making part of the same.

*Know all men by these presents:*

That I, JACOB F. CHANDLER, of Concord, in the county of Merrimack, and State of New Hampshire, have invented a new and useful or improved Machine for Raking and Loading Hay; and I do hereby declare the same to be fully described in the following specification, and illustrated in the accompanying drawings, in which—

Figure 1 is an end view.

Figure 2 is a top view.

Figure 3 is a transverse section.

Figure 4 is a view of the follower-board, detached from the machine.

Figure 5 is a transverse section, showing the rake, as it is fastened to the cross-timber behind the machine.

The nature of my invention consists of an endless apron, shown in the drawings A A A A A, in fig. 2, which revolves around two shafts, B B B B B B, one at the top and one at the bottom of the machine.

Inside of the slats are fastened iron rods C C, extending across the slats, on which are wire teeth D D D D D, which extend through a slot in the slats.

Between each tooth are coils of wire, E E, around the iron rods, at even distances from each other, which, in their coiled form, keep the teeth in their proper position to each other.

A rake, having wire teeth, is fastened to the cross-timber at the back part of the machine, as shown by fig. 5.

The rake should be about twelve feet wide, and when the machine is in motion, will rake the hay from the ground.

The machine is attached to the hind part of the hay-cart by means of shackles, and as the cart is drawn forward by the team, the wheel under the machine is made to turn, which sets it in motion.

The teeth affixed to the iron rods which pass through the slats revolve with the endless apron, and in their revolutions elevate the hay from the front part of the rake, over the top of the machine, on to the cart, and by means of the two slides F F the coiled springs between the teeth are pressed together in their revolutions, as they rise to the top of the machine, bringing the hay into narrower limits, which is guided and kept in place by the follower-board behind the machine.

As each rod on which are placed the teeth passes over the top of the machine, above the ends of the slides, the coiled springs again expand, extending the teeth to their full distance apart on the shaft again, so as to elevate, from the front of the rake, another portion of the hay.

In the cross-bar at the top of the machine are placed stationary teeth $g\ g\ g\ g$, in such a manner that the revolving teeth pass through them, and take the hay from them, causing it to pass over the cross-bar on to the cart without clogging.

The follower-board behind the machine is fastened to the timber in the frame at the bottom of the machine by means of hinges, and is secured at the top by means of hasps, so as to have it close to the ends of the revolving teeth, which will elevate the hay without scattering it.

The wheel $h$, in the shank I, fastened to the centre of the frame in the rear of the machine, is to steady the machine, and keep it at the proper distance from the ground, whilst the rake gathers up the hay as the cart and machine move forward.

When passing over ground where no raking is to be done, the rake can be fastened up from the ground to the cross-timber at the bottom of the machine, by means of hasps.

On the shaft inside of each wheel are ratchets J J, with dogs or catches, so arranged, that in turning corners, or backing in the field, the wheels will turn backward on the shaft, without turning the machine backward.

When the load of hay is completed, the machine can be detached from the cart and left in the field, ready for the next load.

Having described my invention,

What I desire to secure by Letters Patent, is—

The combination and arrangement of the endless apron A, springs E, and inclines F F, to operate as and for the purpose set forth.

JACOB F. CHANDLER. [L. S.]

Witnesses:
   J. B. RAND,
   HORACE CALL.